2,828,247
Patented Mar. 25, 1958

2,828,247

TREATMENT OF PETROLEUM HYDROCARBONS

Rolland G. Bowers, Toledo, Ohio, assignor to Sun Oil Company, Philadelphia, Pa., a corporation of New Jersey No Drawing. Application November 18, 1955
Serial No. 547,858

9 Claims. (Cl. 196—29)

This invention relates to a process for treating petroleum hydrocarbons containing objectionable amounts of mercaptans, and more specifically relates to a process for treating petroleum distillates to convert mercaptans contained therein to innocuous materials.

Various methods have heretofore been employed to sweeten sour petroleum distillates by removing, or rendering innocuous, mercaptans contained therein. Such methods usually involve converting the mercaptans to less odorous sulfides or disulfides, and require carefully controlled amounts of relatively expensive treating agents, or add undesired materials to the distillates. For example, processes heretofore employed frequently use substantial quantities of aqueous solutions of alkali metal hydroxides, such as sodium hydroxide, either alone or together with materials such as phenylene diamines. Such aqueous solutions are capable of removing, or rendering innocuous, mercaptans from hydrocarbons. However, such treatment has substantial disadvantages, such as the introduction, or formation in situ, of substantial quantities of water, salts, or both, in the distillate being treated, which causes deleterious effects and may require additional processing. Also, the use of substantial quantities of strong caustic solutions may yield a product having an increased tendency toward gum formation and toward color formation.

In United States patent application Serial No. 428,119, filed May 6, 1954, now abandoned, there is described and claimed a method of decreasing the mercaptan content of sour petroleum distillates by bringing together, in contact with the distillate, relatively small amounts of an N,N'-dialkyl-p-phenylene diamine, ammonia, water and oxygen. The amounts of the reagents required are so small that subsequent treatment to remove any of the added materials is generally unnecessary. Said application defines the preferred quantity of ammonia to employ as from 10 to 165 p. m.m. (parts per million by weight), since when smaller amounts are used the color of the product is adversely affected. However, use of a quantity of ammonia within this range frequently gives a product with a distinct ammonia odor which remains even after long standing, and such products meet considerable consumer resistance.

An object of the present invention is to provide a process for rendering innocuous at least a substantial proportion of the mercaptans contained in petroleum hydrocarbons and mixtures thereof. A particular object is to provide a process for rendering innocuous the mercaptans contained in petroleum distillates and for simultaneously producing a product of good color and odor. Another object is to provide a process for producing sweet petroleum distillates of good color stability wherein only small quantities of reagents are required so that their subsequent separation from the distillate is unnecessary. Other objects will be apparent from the following specification.

It has now been found that by bringing together, in contact with petroleum hydrocarbons containing objectionable quantities of mercaptans, a phenylene diamine, oxygen, and small quantities of ammonia and aqueous sodium hydroxide, the mercaptans are economically converted to innocuous materials, and further processing to remove the added reagents or products thereof is generally unnecessary. The resulting products do not have an objectionable odor and exhibit enhanced stability toward oxidation and color formation.

In accordance with the process of the invention, small amounts of a phenylene diamine, ammonia and an aqueous solution of sodium hydroxide, are incorporated in a sour petroleum distillate. A small quantity of oxygen must also be present. The order of introducing the reagents is not critical, but it is desirable to first introduce the phenylene diamine, followed by separate or simultaneous introduction of ammonia, aqueous sodium hydroxide, and oxygen. The quantity of oxygen present should be sufficient to oxidize the mercaptans to the disulfides, and can be supplied to the distillate by any convenient means such as by bubbling air or oxygen into the composition being treated, or by permitting the treated hydrocarbons to stand in contact with air or oxygen, or by dissolving air or oxygen in the hydrocarbons prior to the introduction of the phenylene diamine. For convenience it is preferred to employ air as the source of oxygen in the process, but other oxygen-containing gases, or substantially pure oxygen, can be used. After introducing the reagents of the process, the distillate is allowed to stand for a time sufficient for the conversion of mercaptans to the disulfides, usually for from about 1 hour to 4 weeks or more if desirable. After the desired sweetening has occurred, the distillate can generally be employed without further treatment, such as when the distillate is a furnace oil. In some applications, however, removal of a portion of the aqueous sodium hydroxide is desirable, and such removal can be accomplished by permitting the aqueous sodium hydroxide to settle out as a small amount of sludge which can be decanted. Such removal, for example, may be desirable when the distillate is a gasoline, since the aqueous sodium hydroxide may impart a cloudy appearance thereto.

The process of the present invention is operable with petroleum and petroleum products, such as crude oil and the distillate oils boiling within the range of from about 100° F. to about 750° F. Lower boiling hydrocarbons, such as ethane, propane, butane, mixtures thereof, and the like, can be employed in the process to remove mercaptans therefrom, so long as the hydrocarbon or hydrocarbon mixture is maintained in liquid phase during the process. The crude oil or distillate fraction employed can contain up to about 400 milligrams of mercaptans (calculated as sulfur) per liter of distillate, but the concentration of mercaptans will usually range from about 10 to 100 milligrams per liter. Petroleum hydrocarbons having a concentration of mercaptans of 0.0005 percent by weight, calculated as sulfur, and above are herein designated as "sour," whereas hydrocarbons having a concentration of mercaptans below 0.0005 percent by weight are herein designated as "sweet." The progressive conversion of mercaptans results in progressive sweetening of the sour distillate. It is preferred to employ distillates boiling within the gasoline range, and excellent results are obtained therewith in the present process. The boiling range of the distillate will usually vary within the range of from 80° F. to about 430° F.

The process of the invention is especially applicable for removing mercaptans from petroleum distillates, and particularly from gasolines, and for convenience the process of the invention is described with reference thereto, it being understood that the invention is limited only as hereinafter designated. Mercaptan-containing gasoline from any source, such as straight-run, catalytically or thermally cracked, catalytically or thermally reformed, polymer gasoline, or mixtures thereof, give good results but not necessarily under the same conditions of operation, and optimum conditions of operation can vary within the limits herein described. Gasolines containing olefins, such as catalytically cracked gasoline, and blends thereof with other gasolines, give especially good results. Hydrocarbons from other sources, such as from destructive hydrogenation, alkylation, and the like, can be blended with the gasolines for subsequent treatment in accordance with the invention. Other petroleum products that can be treated include naphthas, kerosene, solvents, and furnace oil distillate fractions.

Phenylene diamines that can be employed in accordance with the present invention are the oil-soluble mononuclear N,N'-dialkyl-p-phenylene diamines. Especially good results are obtained with N,N'-dialkyl-p-phenylene diamines in which the alkyl groups contain from one to about 12 carbon atoms per molecule, including such compounds as N,N'-di-secondary-butyl-p-phenylene diamine; N,N'-di-isopropyl-p-phenylene diamine; N,N'-di-secondary-amyl-p-phenylene diamine; N,N'-di-secondary-hexyl-p-phenylene diamine; N-isopropyl-N'-secondary-butyl-p-phenylene diamine; N-isopropyl-N'-secondary-amyl-p-phenylene diamine; and homologues and isomers thereof. The phenylene diamine is usually employed in concentrations of from about 2.5 to 10 pounds per 1000 barrels of distillate, but more or less can be employed depending upon the requirements of the particular distillate oil being treated, or the total reaction time permissible in storage tanks. Thus, if the oil is to be stored for 1 month after treatment, a relatively small quantity of the phenylene diamine can be employed, whereas larger quantities are employed where a shorter storage time is to be used. The fact that slow reaction, using small quantities of reagents and substantially no mixing after the initial introduction of the reagents, gives good results is a substantial advantage over prior processes which require vigorous mixing and large quantities of reagents. At least 1 pound of the phenylene diamine per 1000 barrels of distillate, and not more than 20 pounds per 1000 barrels of distillate, generally should be employed.

Although only small quantities of ammonia and aqueous sodium hydroxide are required, the presence of each is essential to the process of the invention as shown hereinafter by example. The ammonia may be introduced by any convenient or desired means. For example, ammonia gas can be injected into the distillate which may contain one or more of the remaining reagents. Ammonium hydroxide can be employed to supply both ammonia and water, but such operation is not preferred. The sodium hydroxide is added as an aqueous solution, which supplies both the required sodium hydroxide and part or all of the necessary water.

The quantity of ammonia to employ is less than about 3 pounds per 1000 barrels of oil, which is equivalent to about 10 p. p. m. ammonia. It is preferred to employ from 0.1 to 7 p. p. m. of ammonia, since excellent results are achieved therewith.

The quantity of sodium hydroxide to employ varies within the range of from about 10 p. p. m. to 60 p. p. m. The sodium hydroxide is added as an aqueous solution preferably containing from about 1% to 10% NaOH. The quantity of water supplied, within these ranges, is sufficient to obtain excellent results in the present process. It is advantageous to employ a solution containing at least 5% sodium hydroxide, since sufficient water is thereby added to obtain good results, while the quantity of water is so small that subsequent separation thereof from the distillate is not necessary for most purposes, and no deleterious results are observed. In some instances, such as where a relatively concentrated sodium hydroxide solution is used, additional water can be added if desired, such as with the ammonia as ammonium hydroxide, or separately, preferably as steam.

The quantity of oxygen to employ can be varied with good results. A sufficient quantity of oxygen may be dissolved in the distillate, from prior contact with air. If additional oxygen is necessary or desirable, oxygen, air or other free oxygen-containing gas can be introduced into the distillate, or the distillate with added materials can be in contact with air while in storage. An excessive amount of oxygen should not be employed, since undesired oxygenated products may form. In general, a mole ratio of oxygen to mercaptans of from 1:2 to 1:4 gives good results.

Provision for mixing the distillate during or shortly after the introduction of the added materials materially shortens the time required for sweetening to occur. In the event that rapid sweetening of the distillate is desired, it is advantageous to inject continuously the added materials, at appropriate rates, into a stream of the distillate, and to provide a mechanical mixing device thereafter in the flowing stream. The mixed distillate stream is then passed to a storage tank. Both rapid sweetening and rapid separation, by settling, of at least a substantial portion of the aqueous sodium hydroxide is readily obtained by adjusting the degree of such mixing. However, in most instances, especially where the distillate will remain in storage for a substantial time, say at least 2 weeks, any convenient mixing means can be employed with good results. For example, injecting the added materials into the flowing distillate stream, or injection of one or more of the added materials, such as ammonia or an oxygen containing gas, into a body of the distillate containing the remaining added materials, may supply adequate mixing.

Temperature does not appear to be a critical variable within rather wide limits. Somewhat elevated temperatures, up to about 100° F., accelerate the oxidation reaction, and even higher temperatures, up to about 120° F. can be used in some instances. When using elevated temperatures, it is advantageous to use a pressure above atmospheric in order to maintain the ammonia in solution and to prevent the loss of light hydrocarbons.

The time required and completion of the oxidation reaction will be dependent upon the nature and prior treatment of the charge stock, and upon the several variables of the process including the concentration of mercaptans in the distillate, quantity of phenylene diamine employed, the temperature at which the treated composition is maintained, the quantity of oxygen dissolved, the mixing means employed, and the like. It is apparent that sufficient time should be permitted to allow a reduction in the mercaptan concentration to the value desired, which will usually be from a few minutes to about 4 weeks, and usually from about 1 day to 4 weeks. However, longer times, such as 2 months, can be employed, and the fact that small quantities of reagents accomplish sweetening on standing, and that further treatment is generally not necessary, are substantial advantages of the process.

The process of the invention is preferably the final operation in the preparation of distillate petroleum products. In the process a sweet product, e. g. gasoline, can be readily prepared. However, where a small quantity of mercaptans, say up to about 0.001 percent by weight, in the product is permissible, the process variables can be adjusted accordingly, such as by decreasing the time of storage of the distillate in contact with the phenylene diamine, sodium hydroxide and ammonia, or by decreasing the dosage of the phenylene diamine employed. Also, if desired, an additional refining operation can follow the conversion of mercaptans, such as an operation designed to remove traces of water, but in the preferred embodiment such additional treatment is not necessary.

In U. S. application Serial No. 428,119, above-mentioned, the effect of varying the concentration of ammonia is shown. Thus, using a sour gasoline having a mercaptan content of 0.0045 weight percent and a Saybolt color of 22, it is shown that using 5 pounds of N,N'-di-secondary-butyl-p-phenylene diamine per 1000 barrels of gasoline with quantities of water varying from 21 to 334 p. p. m., 1 p. p. m. of ammonia failed to give a product of satisfactory color; after 2 weeks the color varied from 0 to −9 (Saybolt), as compared to +19 for the control. Using identical reactants and conditions except that the ammonia concentration was increased to 10 p. p. m., the color of the products were still unsatisfactory, varying from −2 to 12 (Saybolt) after 2 weeks, although the products were generally sweet. Again under the same conditions except with the ammonia concentration increased to 100 p. p. m., the products were not only sweet but the color thereof was excellent.

In accordance with the process of the present invention, a concentration of ammonia of below 10 p. p. m. is employed, and a small quantity of aqueous sodium hydroxide, as above described, is added. The process gives a sweet product of good odor, color and color stability characteristics.

The following examples illustrate the process of the invention; in which a gasoline having a boiling range of from about 90° F. to 430° F. which was prepared by mixing a catalytically cracked gasoline with a straight-run naphtha fraction was used. The gasoline had a mercaptan content of 0.0029% by weight, calculated as sulfur. The products of the examples must have a Saybolt color, after standing 1 month, of at least 12 to be commercially acceptable.

*Example 1*

(A) Into a stream of gasoline flowing into a 50,000 barrel storage tank were injected: N,N'-di-secondary-butyl-p-phenylene diamine at the rate of 0.005 pounds per barrel of gasoline, a 5% aqueous solution of sodium hydroxide at a rate to give 17.3 p. p. m. of NaOH, anhydrous ammonia at a rate to give 1.5 p. p. m. of ammonia, and air at the rate of 0.3 cubic feet per barrel of gasoline. The gasoline stream containing the added materials was continuously contacted with a mechanical mixer and was then introduced into the 50,000 barrel storage tank. After 1 month, samples representing the gasoline in the tank were tested, found to be sweet, and to have a Saybolt color of +19. The added reagents were not noticeable by usual tests and gave no deleterious results in subsequent storage and/or use of the gasoline; no objectionable odor of ammonia was observed. A very small amount of insoluble material settled out during storage, and remained on the bottom of the vessel as the gasoline was removed.

(B) A similar container of gasoline was permitted to stand 1 month under identical conditions except without adding any reagents thereto. The gasoline remained sour and had a Saybolt color of +10. A similar amount of insoluble material as observed in (A), above settled out during the storage.

(C) To another 50,000 barrels of gasoline were added, as described in (A) above, 250 pounds of N,N'-di-secondary-butyl-p-phenylene diamine and a 5% aqueous solution of sodium hydroxide sufficient to give 17.4 p. p. m. of NaOH; no ammonia was added. Oxygen was supplied by bubbling 0.3 cubic feet of air per barrel into the gasoline stream. After 1 month, samples representing the gasoline product were tested and found to be sweet, but the Saybolt color was −11.

*Example 2*

The procedure of Example 1(A) was repeated using the same quantities of the same reagents except that 0.8 p. p. m. of ammonia and a quantity of a 5% aqueous sodium hydroxide solution sufficient to give 19.1 p. p. m. of NaOH were used.

After 1 month a sweet gasoline having a Saybolt color of +14 was obtained. No objectionable ammonia odor or other deleterious qualities were observed.

The procedure was again repeated except that ammonia was omitted and the quantity of 5% aqueous sodium hydroxide used was sufficient to give 19.4 p. p. m. NaOH. After 1 month the Saybolt color of the gasoline was +10.

*Example 3*

The procedure of Example 1(A) was again repeated using the same quantities of the same reagents except that 1.26 p. p. m. of ammonia and a quantity of the 5% aqueous sodium hydroxide sufficient to give 20.1 p. p. m. NaOH were used. After 1 month a sweet gasoline having a Saybolt color of +14 was obtained. No objectionable odor of ammonia was observed.

The foregoing examples show the effectiveness of using small quantities of ammonia, together with small quantities of sodium hydroxide, to convert a sour petroleum distillate to a sweet distillate of good color, and that when ammonia is omitted, a product of unacceptable color results.

When other petroleum products, such as crude oil, kerosene, furnace oil, normally gaseous hydrocarbons, and the like, are employed in the process, and when other phenylene diamines are employed, within the above-described limits, results substantially equivalent to those of the foregoing examples are obtained. It is also possible to substitute aqueous solutions of alkali metal hydroxides, particularly lithium hydroxide and potassium hydroxide, for the aqueous solution of sodium hydroxide, and good results are obtained therewith. However, solutions of sodium hydroxide are preferred because of economy and the excellent results obtained therewith.

The invention claimed is:

1. Process of decreasing the mercaptan content of sour petroleum hydrocarbons which comprises bringing together, in contact therewith, a small amount of an N,N'-di-alkyl-p-phenylene-diamine, ammonia, an alkali metal hydroxide, water and oxygen.

2. Process of sweetening a sour petroleum distillate which comprises bringing together in the sour petroleum distillate small amounts of an oil soluble N,N'-dialkyl-p-phenylene diamine, ammonia, an aqueous solution of sodium hydroxide and oxygen.

3. Process of sweetening a sour petroleum distillate which comprises bringing together in the sour petroleum distillate from 1 to 20 pounds of an oil soluble N,N'-dialkyl-p-phenylene diamine, from 0.1 to 10 p. p. m. of ammonia, from 10 to 60 p. p. m. of sodium hydroxide contained in an aqueous solution having from 1% to 10% sodium hydroxide, and oxygen, admixing the distillate containing the added materials, and maintaining the added materials in contact in the distillate for a time sufficient to obtain a sweet distillate having a Saybolt color of at least 12.

4. Process of sweetening a sour petroleum distillate which comprises bringing together in the sour petroleum distillate from 1 to 20 pounds of an oil soluble N,N'-di-secondary-butyl-p-phenylene diamine from 0.1 to 10 p. p. m. of ammonia, from 10 to 60 p. p. m. of sodium hydroxide contained in an aqueous solution having from 1% to 10% sodium hydroxide, and oxygen, admixing the distillate containing the added materials, and maintaining the added materials in contact in the distillate for a time sufficient to obtain a sweet distillate having a Saybolt color of at least 12.

5. Process according to claim 4 wherein said petroleum distillate is a gasoline.

6. Process according to claim 4 wherein said petroleum distillate is a naphtha.

7. Process according to claim 4 wherein said petroleum distillate is a kerosene.

8. Process according to claim 4 wherein said petroleum distillate is a furnace oil.

9. Process according to claim 4 wherein said petroleum distillate is a normally gaseous hydrocarbon.

References Cited in the file of this patent

UNITED STATES PATENTS

| | | |
|---|---|---|
| 2,616,831 | Rosenwald | Nov. 4, 1952 |
| 2,729,592 | Niehaus | Jan. 3, 1956 |